United States Patent [19]

Stier

[11] 4,074,593
[45] Feb. 21, 1978

[54] MACHINE FOR TREATING CIRCULAR TOOTHED SAWS

[75] Inventor: Otto Stier, Biberach, Riss, Germany

[73] Assignee: Vollmer Werke Maschinenfabrik GmbH, Germany

[21] Appl. No.: 770,949

[22] Filed: Feb. 22, 1977

[30] Foreign Application Priority Data

Feb. 24, 1976 Germany .............................. 2607473

[51] Int. Cl.² ........................ B23D 63/14; B24B 5/00
[52] U.S. Cl. ........................................ 76/37; 51/108 R
[58] Field of Search ............. 76/37, 42, 43, 77, 33–35, 76/48, 50; 51/108 R, 134, 53, DIG. 15; 29/48.5

[56] References Cited

U.S. PATENT DOCUMENTS

| | | | |
|---|---|---|---|
| 2,507,998 | 5/1950 | Russell | 51/108 R |
| 3,670,458 | 6/1972 | Faure | 51/108 R |
| 3,766,806 | 10/1973 | Benner | 76/42 |

Primary Examiner—Harold D. Whitehead
Assistant Examiner—Roscoe V. Parker
Attorney, Agent, or Firm—Burns, Doane, Swecker & Mathis

[57] ABSTRACT

A machine for machining the teeth of circular saws includes a rotary table. The table has a plurality of cotters for holding the blades. The table is rotatable to bring each saw successively to a plurality of machining stations. At each station the saw is rotated about its axis in increments corresponding to the spacing of the teeth. After each such incremental rotation a tooth is machined. A feeding mechanism for rotating the saw, and a locking mechanism for holding the saw at each incremental position are mounted on the table at each cotter. A stationary activating mechanism is situated adjacent each machining station to actuate these mechanisms.

9 Claims, 3 Drawing Figures

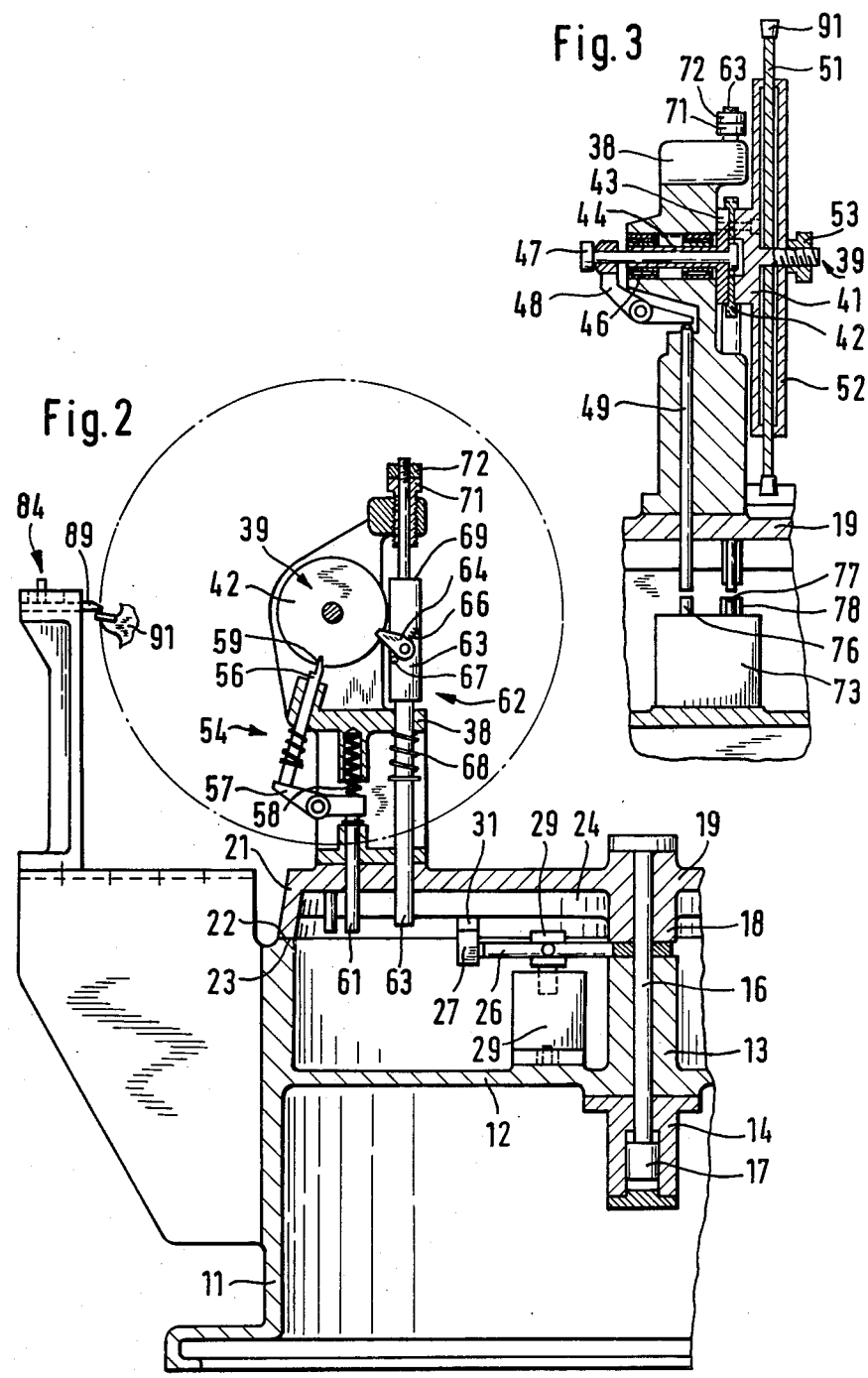

MACHINE FOR TREATING CIRCULAR TOOTHED SAWS

BACKGROUND AND OBJECTS

The invention concerns a machine tool for treating circular saws, particularly those with teeth covered with hard metal.

Circular saws are usually stamped or milled from steel-sheet platinum, and after that they still require a number of treatments, before they can be sold and used. In particular, those circular saws which have teeth shortened by forging and/or covered with hard metal require polishing of the cutting edge of the teeth, of both sides of each tooth, and of the back of the teeth. As a rule, these various polishing processes are carried out on high-priced special machines, on which the circular saws are set up one after the other.

It is also possible to carry out the said polishing processes successively on one single machine. That is, the circular saw, which is attached to a cotter and turned by a feeding device step by step by each tooth division, gets polished on the front edge of the individual teeth during the first complete turn and during subsequent turns it gets polished on the sides and on the back of the teeth.

This kind of treatment was appropriate in the case of high-priced circular saws, but for purposes of mass production, especially in the case of circular saws mounted with hard metal and used in household workshops, a shorter treatment would be desirable.

Therefore, the purpose of the invention is to provide a machine tool for circular saws, particularly a grinding machine for circular saws, and especially for circular saws with teeth covered with hard metal, in such a way that it would be possible to conduct the process of machining within a shorter period of time.

BRIEF SUMMARY OF PREFERRED EMBODIMENT

According to the invention, this problem is solved by providing a machine tool which is characterized by a switch table which turns on a stand and can be stopped in predetermined rest positions. At least two affixing cotters are mounted on the table at distances corresponding to the angle between two rest positions of the switch table. The cotters are attached to the table, and each circular saw can be mounted thereon for rotary movement therewith. A locking device is attached to each of the affixing cotters and is designed to lock the associated circular saws in predetermined positions against further turning. The locking positions correspond to the location of each tooth of the saw. At least one feeding device for turning the circular saw by one or several tooth divisions is provided. A preparation station and machining stations are provided. These stations are spaced by an angle corresponding to the angle between two rest positions of the switch table from the preparation stop. Each machining station includes at least one saw treating device.

This makes it possible to utilize the time during which one circular saw is machined at at least one processing station, to remove a finished circular saw from an affixing cotter located in the area of the preparation station and replace it with a rough circular saw. The rough saw is properly oriented relative to the cotter and then locked in place so that a tooth of the rough circular saw reaches exactly the expected position at the processing stop or at the first of a group of several processing stops. At the same time, the combination of each affixing cotter with its own locking device guarantees that the feeding device can operate effectively and keep turning the circular saw gradually at the rate at which its teeth are to be machined. The number of the machining stops is purposefully synchronized with the number of operational cycles which must be applied to each tooth. The number of the affixing cotters is at least equal to the number of the stations, which means the number of the machining stations plus the number of the preparation stations.

In the preferred design of the invention, each affixing cotter has a notched plate, which can be clamped together with a circular saw, so that they can turn jointly around their axle. The notched plate defines the stop positions for the appropriate locking device and the feeding device, which correspond to the tooth spacing of the circular saw. A lug is set up at the preparation station for alignment with a tooth of the circular saw. The lug makes it easier to put each saw in a pre-set angular position as soon as it is attached to the affixing cotter and is fastened together with the appropriate notched plate.

It is possible to set up permanently a feeding device at each machining station, which then can become engaged at any time with a circular saw or clamping device, when the circular saw reaches the machining station. However, it is preferable, according to an additional feature of the invention that each affixing cotter has its own feeding device set up on the switch table. In that case, each circular saw or a circular saw clamped together with a notched plate can remain engaged with the appropriate feeding device during the joint rotation on the switch table. This increases the degree of reliability that each circular saw would continue rotating after each machining of a tooth as expected, by one tooth spacing, or in special cases by several tooth spacings.

Hydraulic, pneumatic, or electromagnetic activating devices can be set up on the switch table to operate the locking devices and feeding devices. However, according to the invention, it is preferable that the locking devices and feeding devices in the area of the machining station can be operated, when the switch table is in a stationary position, from a fixed activating device. As a result of this separation of the locking devices and feeding devices from the corresponding activating devices, which are set up in a stationary position, it is possible to build the locking and feeding devices with a rather simple design and small weight, so that the inertia of the switch table and all the devices attached to it can be kept at the lowest possible level.

A recess is assigned in the switch table for each locking device and for each feeding device, so that the activating device can operate the locking and feeding devices through this recess.

What is particularly preferable is a design of the machine according to the invention, in which each affixing cotter is mounted, with axial play, on a trestle carried by the switch table and can be moved by means of a clamping or bracing device into a position, in which the circular saws, attached to the clamping device, are propped against the trestle in axial direction. As a result, oscillations of the circular saws during the machining are avoided to a considerable extent. The clamping device at the machining station is activated by a fixed activating device.

Each affixing cotter is fastened advantageously on the switch table in such a way that the plane of the circular saw fastened to it contains the rotating axle of the switch table. As a result of this, it is possible to set up on a switch table of a given diameter three, four, or — if necessary — a larger number of circular saws of relatively large diameter at the same angular distances on an affixing cotter each, and to provide correspondingly two, three, or — if necessary — a larger number of machining stations around the switch table.

Preferably, three machining stations are provided for. These respectively show a machining device with a grinding wheel for the polishing grind of the front edge of the tooth, a couple of machining devices each of which has a grinding wheel for the polishing grind of the sides of the tooth, and a machining device with a grinding wheel for the polishing grind of the back of the tooth.

In this case, it is purposeful, if the grinding wheels for the polishing grind of the front edge of the tooth and for the polishing grind of the sides of the tooth in rest positions of the switch table can move back and forth in synchronization with the feed movements of the circular saws, moving essentially in radial direction to the rotating axle of the switch table. Also, the grinding wheel for the polishing grind of the back of the tooth moves back and forth essentially in the tangential position with regard to the open angle of the teeth of the circular saw.

THE DRAWING

A preferred embodiment of the invention is explained in further detail in connection with the accompanying drawing in which:

FIG. 2 shows a vertical cross section taken along the line II—II in FIG. 1.

FIG. 3 shows a vertical cross section taken along the line III—III in FIG. 1.

DETAILED DESCRIPTION OF PREFERRED EMBODIMENT

Figure 1:
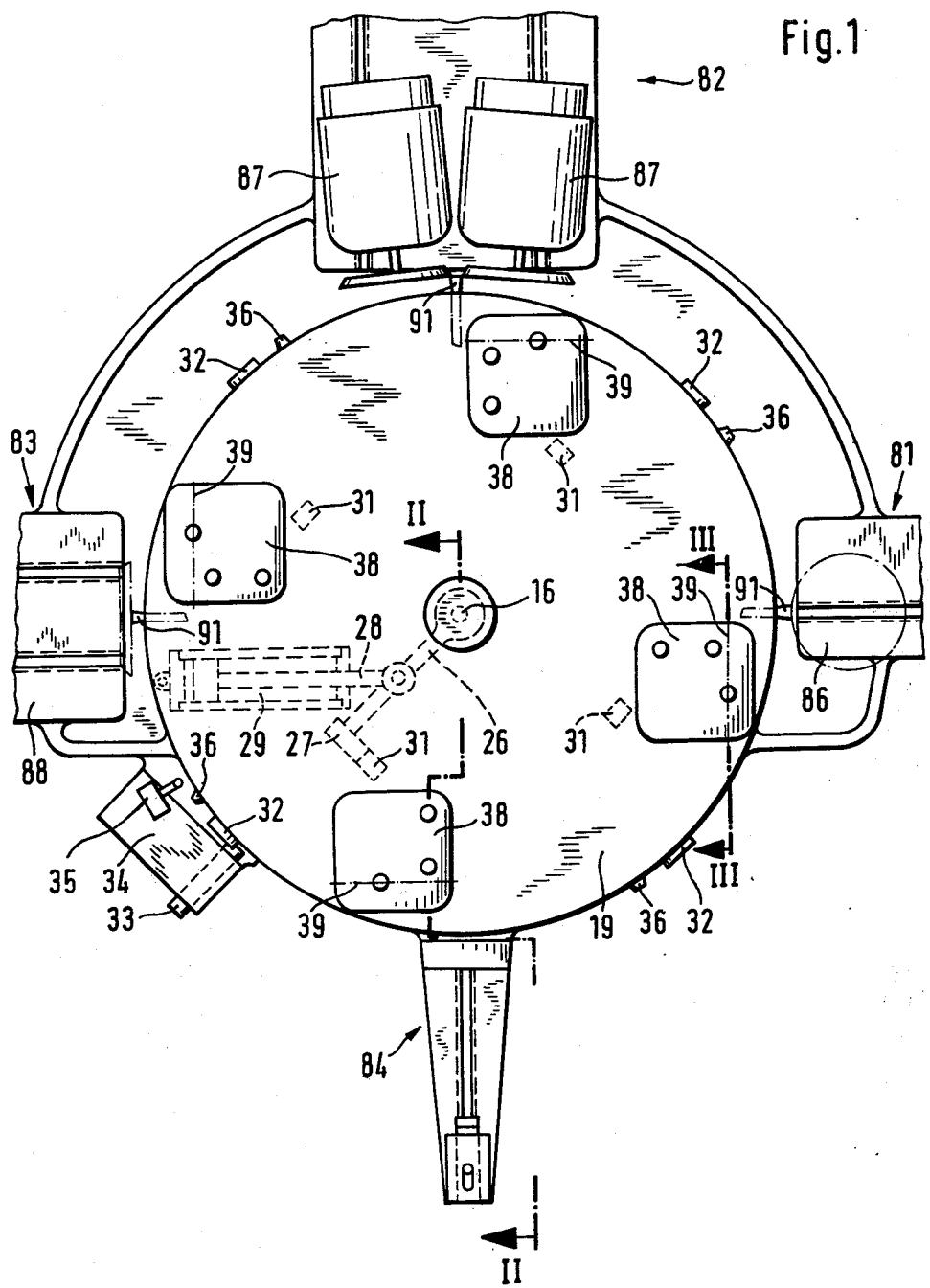
FIG. 1 shows a top view of a machine for treating circular saws.

The supporting structural part of the machine presented below is a stand 11 in the form of a cast or welded hollow body. This stand is essentially cylindrical and is open at the top and at the bottom. The stand 11 has below its open upper front side an intermediate base 12, in the middle of which there is a vertical duct 13 built in one piece therewith. At the lower end of the duct 13, there is fastened a double-action hydraulic cylinder 14. In the duct 13 and in the cylinder 14 there is slidingly mounted a vertical axle 16, which can be pushed and pulled axially. At the lower end of the axle 16, there is fastened or built in one piece a piston 17 which is guided in the cylinder 14. At the upper end of the axle 16, there is fastened a hub of a circular switch table 19. The switch table 19 shows at its outer edge a pinafore 21 in the form of a truncated cone. When the switch table is in its resting position, a ring-shaped lower front surface 22 of the pinafore rests on a ring-shaped upper front surface 23 of the stand 11. The pinafore 21 is connected with the hub 18 by several strong ribs 24.

The switch table 19 can be raised from the stand 11 and turned gradually, when the lower side of the piston 17 is under pressure. A lever 26 rests on the axle 16 for turning of the switch table. The lever has at its free end an arm 27, and about in the middle it is connected in an articulated way with the piston rod of a piston cylinder unit 29. The unit 29 is pneumatic or hydraulic and rests on the stand 11 below the switch table. Provided on the switch table are pusher plates for the bolt 27 which consist of four blocks 31. These blocks are fastened around the axle 16 below the switch table 19 at spaced apart distances of 90°. Each time the piston-cylinder unit 29 is pressurized on one side (which in FIG. 1 is the left side), it turns the lever 26 90°. Thus the arm 27 takes with it one of the blocks 31. As a result of this, the entire switch table 19 rotates by 90°.

Four lugs 32 are attached to lock the switch table in four resting positions set at 90° from each other. The lugs 32 are attached to the outer edge of the switch table for cooperation with a cross bar 33. The cross bar 33 can slide radially in relation to the switch table 19 and passes through a housing 34, which is fastened to the stand 11. It is biased towards the switch table and can move away from it by means of an electromagnet or a hydraulic motor, when the switch table is to turn again 90°. A circuit breaker 35 is attached to the housing 34, which controls an electromagnetic valve not shown in the figure, located within the pressure supply circuit of the piston-cylinder unit 29. Switch cams 36 are carried by the switch table 19 and are positioned to actuate the circuit breaker 35. Accordingly, the rotating movement of the switch table is slowed down as soon as one of the switch cams 36 activates the switch 35.

Four supporting trestles 38 are fastened on the switch table 19 at the same radial distances from the axle 16 and at angular distances of 90° from each other. One of these trestles, which are only indicated in FIG. 1 with the corresponding structural parts, is presented in detail in FIGS. 2 and 3. An affixing cotter 39 is arranged at each supporting trestle at a distance from the upper surface of the switch table 19. Its geometrical axis lies at a distance from and at right angles with the axle 16. The affixing cotter 39 is built in one piece with a flange 41 or is fastened to it, and presents a screw thread in the area of its free end. The flange 41 is screwed onto a notched plate 42 and a flange 43 at one end of a casing 44. The casing 44 can turn in bearings 46 and is mounted so that it can slide in the axial direction. The casing 44 encompasses a pulling rod 47, which connects the flange 43, and thereby also the affixing cotter 39, with an essentially vertical arm of an angular lever 48, which is pivotably mounted on supporting trestle 38. The other essentially horizontal arm of the angular lever 48 is propped against a tapped 49, which can slide vertically in the supporting trestle. The pulling rod 47, lever 48, and tappet 49 constitute a bracing device.

As shown in FIG. 3, a circular saw 51 and a circular-shaped bracing plate 52 are fixed on the affixing cotter 39. A bracing nut or matrix 53 is screwed onto the cotter in such a way that the circular saw 51 is clamped between the flange 41 and the bracing plate 52, and thereby also connected for rotation with the notched plate 42.

Any undesirable turning of the circular saw 51 is prevented by a locking device 54, which cooperates with the graduated plate 42. On each trestle 38 there is provided a locking device 54 which includes a pin 56. This pin 56 passes through the trestle and can slide in its longitudinal direction (which is a radial direction in relation to the notched plate 42). The pia 56 bears against one of the arms of an angular lever 57, which lever 57 is pivotably mounted on the supporting trestle 38. A spring 58, which is propped against the supporting trestle, presses against the other arm of the angular lever 57 in such a way that the pin 56 steadily strives to get into one of a number of rest places or notches 59 which have been provided on the circumference of the graduated plate 42. Each locking device 54 has a tappet 61 for the purpose of disengaging the pin 56. The tappet 61 can slide perpendicularly relative to the corresponding supporting trestle 38, and can engage the lever 57 to retract the cross bar 56. That is, a force counteracting the force of the spring 58 can be brought up against the angular lever 57.

The feeding device 62 makes it possible to continue turning gradually the graduated plate 42 — and thereby also to turn the circular saw 51, which is braced against it. In the given example, each supporting trestle 38 carries its own feeding mechanism 62. The feeding mechanism includes a tappet 63 which can slide perpendicularly relative to the corresponding supporting trestle, and a finger 64 which is swivelably mounted on the tappet. The finger 64 is controlled by a spring 66 in such a way that it is biased toward one of the notches 59 of the notched plate 42. However, the turning movement of the finger under the pressure of the spring 66 is restricted by a lug 67 attached to the tappet 63 in such a way that the finger, which stops in one of the rest places 59 at each upward movement of the tappet 63, is in a position to make the graduated plate 42 perform a rotating movement. The tappet 63 is biassed downwardly by a spring 68, which presses against the tappet and against the supporting trestle 38. The upward movement of the tappet 63 is restricted by a shoulder 69 built on the tappet. The shoulder 69 cooperates with a lower front surface of a housing 71, which housing is screwed into the supporting trestle 38 in an adjustable position. A chuck ring 72 is screwed onto the upper end position of the tappet 63. Acting together with the housing 71, the chuck ring restricts the upward movement of the tappet.

The described tappets 49, 61, and 63 extend downwards through recesses in the switch table 19. Since the switching table is rotatable 360 degrees in four equal steps of 90 degrees by the arm 33, there are four possible rest positions for each affixing cotter 39. In three of the possible four resting positions, the tappets 49, 61, and 63 stand over an activating device 73. Each of the three activating devices 73 has three vertical piston-cylinder units which can be regulated independently. The piston rods 76, 77, and 78 of these units are associated in each resting position of the switch table, with respective ones of the tappets 49, 61, or 63 which stand over the activating device 73, so that when any of the piston rods are extended, the corresponding tappet can be pushed upwards.

Three work stations 81, 82, and 83, as well as a preparation station 84 are arranged around the switch table 19 on the stand 11, so that they are set up at an angle of 90 degrees from each other. If desired, the table rotating mechanism 29, 31 could be designed to turn the table at less than 90 degree increments so that additional cotters could be provided. In that case the machining stations could be spaced by angles equal to or greater than the angles between successive rest positions of the table.

The work station 81 employs a machining device 86 for grinding of the top edge of the tooth; the work station 82 is provided with two machining devices 87 for grinding of the sides of the tooth; and finally the work station 83 is equipped with a machining device 88 for grinding of the back of the tooth. All of the machining devices 86, 87, and 88 can be moved forth and back essentially in the radial direction with regard to the switch table 19 by means of a feeding device which is not shown. This feeding device is of the usual type, consisting for example of a piston-cylinder unit which activates a pressure pad, or a coil spindle. The radial distance of the work stations 81, 82, and 83 from the switch table 19 is adjustable.

The preparation station 84 includes a lug 89 for a saw tooth 91. The surface of the lug 89 (in the example shown in the figures it is the lower side) lies in the same horizontal plane as the geometrical axis of the affixing cotter 39 on the four supporting trestles 38. The radial distance of the lug 89 from the switch table 19 is adjustable.

The machine tool described above operates as follows:

At the preparation stop 84, a circular saw is set up on the affixing cotter 39 on the supporting trestle 38 located directly in front of the stop 84. The bracing plate 52 is also set up on the affixing cotter 39 and first pressed against the circular saw 51 lightly with the tightening matrix 53 screwed loosely onto the cotter. Now the circular saw 51 is turned on the affixing cotter 39, which is held by the locking device 54 against rotation, until one of the saw teeth 91 comes to the lug 89. With the teeth of the saw blade having been thus properly oriented relative to the rest positions 59 of the plate 42, the matrix 53 is tightened to firmly press the saw blade against the flange 41 so that the saw blade is fixedly secured to the affixing cotter 38.

After that, the cross bar 33 is retracted; the cylinder 14 is pressurized on its lower side, so that the switch table is raised slightly from the pedestal 11; and the piston-cylinder unit 29 is pressurized on its extension side (which in FIG. 1 is the left side), so that the switch table is turned 90 degrees. As a result, the circular saw 51 reaches the work stop 81. In this new position, the cylinder 14 is pressurized on the upper side of the piston 17, so that the switch table 19 is braced firmly against the pedestal 11.

Immediately after that, the piston rod 76 is extended, so that the tappet 49 slides upwards. As a result, the angular lever 48 shown in FIG. 3 swings in the counterclockwise direction and presses the flange 43, by means of the draw bar 47, against the supporting trestle 38. Since the flange 41 is connected to the flange 43, this assures that any play of the circular saw 51 with regard to the supporting trestle 38 is eliminated.

The machining device 86 is now pushed in radially only to such an extent that it grinds the front edge of the first tooth 91 of the circular saw, the tooth which was put against the lug 89 at the preparation stop. After the grinding of this saw tooth, the tappet 49 is released temporarily from the piston rod 76, while the tappet 61 is pushed upwards for a short time by the piston rod 77, so that the pin releases the plate 42. Immediately after that, the piston rod 78 pushes the tappet 63 upwards so that, by its finger 64, it turns the plate 42 by one tooth spacing. Then the pin 56 rests again in a recess in the plate 42, after which the tappet 61 is released from the piston rod 77. The piston rod 78 lets return the tappet 63, until the chuck ring 72 again bears against the housing 71 as shown in FIG. 2. At the same time, the tappet 49 is pushed again upwards by the piston rod 76, so that the circular saw 51 is fastened once more firmly to the supporting trestle 38.

The sequence described above is repeated until all the teeth of the circular saw 51 have their front edges ground. In the meantime, a new circular saw is set up and fastened to the affixing cotter on the next supporting trestle 38 in the manner described above at the preparation station 84.

The switch table turns now once more 90 degrees, so that the circular saw 51 which was set up on it previously reaches the second machining station 82, where the blade is maneuvered by the associated activating device 73 and all the saw teeth 91 are ground one after the other on both sides. Meanwhile, the second circular saw has the front edges of its teeth ground at the first machining station 81, and a third circular saw is fastened on a free affixing cotter 39 at the preparation station 84. In this way, the circular saws 51 run successively through all the machining stations 81, 82, and 83, and finally they come back to the preparation station 84, from which they are removed.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A machine for treating circular toothed saws, comprising:
    a stand;
    a table rotatably mounted in said stand so as to be rotatable between a preparation station and at least one tooth treating station;
    at least two rotatable cotters mounted on said table and spaced angularly by a distance corresponding to the angular distance between said stations;
    means for securing a circular saw to said cotter so that said saw is rotatable with said cotter,
    feeding means for rotating each saw by at least one tooth spacing;
    locking means for releasably locking each cotter in a given position between successive feeds; and
    said treating station including means for treating the saw teeth after successive rotations of the saw blade by said cotter.

2. A machine according to claim 1 further including a plate attached to each of said cotters so that said cotter and its associated saw and plate turn concurrently around the axis of the cotter; said plate having engageable means spaced around its periphery to be sequentially engaged by said lock means; the spacing between said engageable means corresponding to the spacing between successive saw teeth; said preparation station including a lug arranged for setting.

3. A machine according to claim 1 wherein said feeding means are mounted on said table and are each connected to an associated one of said plates for turning said cotter and its associated saw.

4. A machine according to claim 1 further including a stationary activating mechanism situated adjacent said treating station for actuating a locking means and feeding means when the latter become positioned at said treating station.

5. A machine according to claim 4 wherein said locking means and said feeding means are mounted on the top of said table; said table including apertures which provide access for means controlled by said activating means for operating said locking means and feeding means.

6. A machine according to claim 1 further including a plurality of trestles mounted on said table; each of said cotters being mounted on one of said trestles for relative play in the axial direction of said cotter; and bracing means mounted on said table for eliminating said play and holding said cotter non-rotatable relative to said trestle.

7. A machine according to claim 6 further including a stationary activating mechanism situated at said treating station for activating said locking means, said feeding means, and said bracing means.

8. A machine according to claim 1 wherein said cotter is positioned so that the plane of a saw carried thereby contains the axis of rotation of said table.

9. A machine according to claim 1 wherein said at least one treating station comprises three machining stations; a first machining station including a grinding wheel for grinding the front edge of each tooth, a second machining station including a pair of grinding wheels for grinding the sides of each tooth, and a third machining station including a grinding wheel for grinding the back of each tooth.

* * * * *